(12) United States Patent
Hunleth et al.

(10) Patent No.: US 7,634,793 B2
(45) Date of Patent: Dec. 15, 2009

(54) CLIENT-SERVER ARCHITECTURES AND METHODS FOR ZOOMABLE USER INTERFACES

(75) Inventors: Frank A. Hunleth, Rockville, MD (US); Charles W. K. Gritton, Sterling, VA (US); Kevin M. Conroy, Rockville, MD (US); Ryan Stoner, Chicago, IL (US)

(73) Assignee: Hillcrest Laboratories, Inc., Rockville, MD (US)

( * ) Notice: Subject to any disclaimer, the term of this patent is extended or adjusted under 35 U.S.C. 154(b) by 684 days.

(21) Appl. No.: 11/144,880

(22) Filed: Jun. 3, 2005

(65) Prior Publication Data

US 2005/0283798 A1 Dec. 22, 2005

Related U.S. Application Data

(60) Provisional application No. 60/576,786, filed on Jun. 3, 2004.

(51) Int. Cl.
*G06F 13/00* (2006.01)
*H04N 5/445* (2006.01)
*H04N 7/173* (2006.01)

(52) U.S. Cl. .............................. 725/54; 725/61; 725/114

(58) Field of Classification Search .................... 725/40, 725/52, 54
See application file for complete search history.

(56) References Cited

U.S. PATENT DOCUMENTS 5,745,710 A * 4/1998 Clanton et al. ................. 725/60
5,845,083 A * 12/1998 Hamadani et al. ........... 709/231
5,907,323 A    5/1999 Lawler et al.
6,804,708 B1   10/2004 Jerding et al.
2003/0011636 A1  1/2003 Feroglia et al.
2003/0046691 A1 * 3/2003 Nakagawa ..................... 725/38
2004/0268393 A1 12/2004 Hunleth et al.
2005/0182792 A1  8/2005 Israel et al.

FOREIGN PATENT DOCUMENTS

EP       1 126 701 A1     8/2001
WO    WO 00/79797 A1    12/2000
WO    WO 02/47393 A      6/2002

OTHER PUBLICATIONS

Supplementary European Search Report for EP 05 75 7363 mailed Jun. 7, 2007.
International Search Report for PCT/US2005/019705 mailed Aug. 17, 2006.
Written Opinion for PCT/US2005/019705 mailed Aug. 17, 2006.
Office Action for Chinese Patent Application No. 200580017859.2, mailed Nov. 2, 2007.
Office Action for European Patent Application No. 05 757 363.6, mailed Sep. 10, 2007.
Office Action for European Patent Application No. 05 757 363.6, mailed Jan. 22, 2008.

* cited by examiner

*Primary Examiner*—John W Miller
*Assistant Examiner*—Chris Parry
(74) *Attorney, Agent, or Firm*—Potomac Patent Group PLLC

(57) ABSTRACT

Exemplary embodiments of the present invention provide methods and systems for communicating and processing data in communication networks, e.g., cable networks and/or interactive television networks. Selective use of different data streams and encoding techniques enable sophisticated user interfaces to be generated on client devices having varying processing capabilities. MPEG encoding techniques have reduced complexity to enable better response time to user requests. Specialized user interface features, such as hover-zooming, are enabled.

13 Claims, 12 Drawing Sheets

DRAMA

APOLLO 13 (1995)  Price: $3.99
Length: 120 Minutes

BUY / WATCH TRAILER / BACK

Massively popular, fast-paced retelling of near-disaster space mission. Much to enjoy for fans of suspense and special effects. Well-developed characters appeal even to those who don't like typical Hollywood epics.

Actors: Tom Hanks, Bill Paxton, Kevin Bacon, Gary Sinise, Ed Harris

Tom Hanks

American leading actor Tom Hanks has become one of the most popular stars in contemporary American cinema. Born July 9, 1956, in Concord, CA.

Rated by Empire Magazine as 17th out of The Top 100 Movie Stars of All Time in October 1997, Hanks is married to actress Rita Wilson, with whom he appeared in Volunteers (1985).

Filmography
Saving Private Ryan
The Green Mile
Forrest Gump
Road to Perdition
Apollo 13
Philadelphia
Toy Story
Cast Away

| METADATA CATEGORIES | | TV BROWSER/PVR | TMS | GEMSTAR | MSO | VOD BROWSER | MUZE | IMDB | ALLMOVIEGUIDE | MUSIC BROWSER | ALLMOVIEGUIDE | MUZE | GRACENOTE | FREEDB.ORG | MUSICBRAINZ.ORG |
|---|---|---|---|---|---|---|---|---|---|---|---|---|---|---|---|
| CONTENT | TITLE | | X | X | X | | X | X | X | | X | X | X | X | X |
| | YEAR | | X | | | | X | X | X | | | X | X | X | X |
| | STUDIO/PUBLISHER | | M | | | | | X | X | | X | | X | | |
| | EPISODE NAME | | X | | | | | | | | | | | | |
| | SYNOPSIS | | X | | | | | X | X | | | | | | |
| | DESCRIPTION | | X | | | | | X | X | | | | | | |
| | PLOT KEYWORDS | | | | | | | X | X | | | | | | |
| | PRODUCER | | X | | | | | X | X | | | | | | |
| | DIRECTOR | | X | | | | | X | X | | | | | | |
| | PRINCIPAL CAST | | | | | | | X | X | | | | | | |
| | EXTENDED CAST | | | | | | | X | | | | | | | |
| | ARTIST | | | | | | | | | | | X | | X | X |
| | WRITERS | | X | | | | | X | X | | | | | | |
| | CATEGORY | | | | | | | X | | | | | | | |
| | GENRE | | X | | | | X | X | X | | X | X | | | |
| | AIRING (P.F.R) | | X | | | | | | | | | | | | |
| | RUNTIME | | X | | | | X | X | X | | X | X | X | X | X |
| | RATING | | X | | | | X | X | X | | X | | | | |
| | PICTURE/COVER ART | | | | | | X | | X | | X | | ? | | |
| | TRACKS | | | | | | D | X | | | X | X | X | X | X |
| | TRAILERS | | | | | | | | | | | | | | |
| | CONTENT LOOKUP | | | | | | | | | | | | X | X | X |
| CAST | BIOS | | | | | | | X | X | | X | | | | |
| | CREDITS | | | | | | | ? | | | | | | | |
| | PHOTO | | X | | | | | | | | | | | | |
| COLLABORATIVE | USER RATING | | | | | | | X | | | | | | | |
| | EDITORIAL RATING | | M | | | | | X | X | | X | | | | |
| | CRITICAL REVIEWS | | | | | | | X | X | | X | | | | |
| | LINKS TO OTHER MEDIA | | | | | | | X | X | | | | | | |
| INSTANCE | SYSTEM ID | | | | X | | | | | | | | | | |
| | TIME | | X | X | | | | | | | | | | | |
| | LOCATION | | X | X | X | | | | | | | | | | |
| | PRICE | | P | | | | | X | | | | | | | |
| | USAGE RESTRICTIONS | | | | | | | | | | | | | | |
| | COPY RESTRICTIONS | | | | | | | | | | | | | | |

ND METHODS FOR ZOOMABLE USER INTERFACES

CLIENT-SERVER ARCHITECTURES AND METHODS FOR ZOOMABLE USER INTERFACES

RELATED APPLICATION

This application is related to, and claims priority from, U.S. Provisional Patent Application Ser. No. 60/576,786, filed on Jun. 3, 2004, entitled "ZUI on PVR Architecture Specification", the disclosure of which is incorporated here by reference.

BACKGROUND

The present invention describes systems and methods for processing and transferring multimedia data between nodes in a communication system, e.g., an interactive television system, usable to create, for example, sophisticated entertainment user interfaces in the home.

Technologies associated with the communication of information have evolved rapidly over the last several decades. Television, cellular telephony, the Internet and optical communication techniques (to name just a few things) combine to inundate consumers with available information and entertainment options. Taking television as an example, the last three decades have seen the introduction of cable television service, satellite television service, pay-per-view movies and video-on-demand. Whereas television viewers of the 1960s could typically receive perhaps four or five over-the-air TV channels on their television sets, today's TV watchers have the opportunity to select from hundreds and potentially thousands of channels of shows and information. Video-on-demand technology, currently used primarily in hotels and the like, provides the potential for in-home entertainment selection from among thousands of movie titles. Digital video recording (DVR) equipment such as offered by TiVo, Inc., 2160 Gold Street, Alviso, Calif. 95002, further expand the available choices.

The technological ability to provide so much information and content to end users provides both opportunities and challenges to system designers and service providers. One challenge is that while end users typically prefer having more choices rather than fewer, this preference is counterweighted by their desire that the selection process be both fast and simple. Unfortunately, the development of the systems and interfaces by which end users access media items has resulted in selection processes which are neither fast nor simple. Consider again the example of television programs. When television was in its infancy, determining which program to watch was a relatively simple process primarily due to the small number of choices. One would consult a printed guide which was formatted, for example, as series of columns and rows which showed the correspondence between (1) nearby television channels, (2) programs being transmitted on those channels and (3) date and time. The television was tuned to the desired channel by adjusting a tuner knob and the viewer watched the selected program. Later, remote control devices were introduced that permitted viewers to tune the television from a distance. This addition to the user-television interface created the phenomenon known as "channel surfing" whereby a viewer could rapidly view short segments being broadcast on a number of channels to quickly learn what programs were available at any given time.

Despite the fact that the number of channels and amount of viewable content has dramatically increased, the generally available user interface and control device options and frameworks for televisions have not changed much over the last 30 years. Printed guides are still the most prevalent mechanism for conveying programming information. The multiple button remote control with simple up and down arrows is still the most prevalent channel/content selection mechanism. The reaction of those who design and implement the TV user interface to the increase in available media content has been a straightforward extension of the existing selection procedures and interface objects. Thus, the number of rows and columns in the printed guides has been increased to accommodate more channels. The number of buttons on the remote control devices has been increased to support additional functionality and content handling. However, this approach has significantly increased both the time required for a viewer to review the available information and the complexity of actions required to implement a selection. Arguably, the cumbersome nature of the existing interface has hampered commercial implementation of some services, e.g., video-on-demand, since consumers are resistant to new services that will add complexity to an interface that they view as already too slow and complex.

An exemplary control framework having a zoomable graphical user interface for organizing, selecting and launching media items is described in U.S. patent application Ser. No. 10/768,432, filed on Jan. 30, 2004 to Frank A. Hunleth, the disclosure of which is incorporated here by reference. This framework provides exemplary solutions to the aforedescribed problems of conventional interfaces. Among other things, such exemplary frameworks provide mechanisms which display metadata associated with media items available for selection by a user in a manner which is easy-to-use, but allows a large number of different media items to be accessible. One feature of exemplary frameworks described in this patent application is the use of zooming to provide, among other things, visually informative transitions between different semantic levels of media objects displayed by the interface and as a mechanism for highlighting objects currently being considered by a user.

The implementation of these types of advanced user interfaces is complicated by the system architectures and communication nodes involved in the processing and transport of data used to generate these interfaces from various sources to an end user's device, e.g., a television. As will be described in more detail below, this data includes so-called metadata that describes the media content. The term "metadata" as it is used herein refers to all of the supplementary information that describes the particular content of interest associated with media items available for selection by a user. As an example for movie objects, the metadata could include, e.g., the title, description, genre, cast, DVD cover art, price/availability, cast bios and filmographies, links to similar movies, critical reviews, user reviews, the rights associated with the metadata itself, rights associated with the content, advertising metadata linked to the content of interest, etc. An exemplary system for capturing, processing, synthesizing and forwarding metadata suitable for such advanced user interfaces is described in U.S. patent application Ser. No. 11/037,897 entitled "A Metadata Brokering Server and Method", filed on Jan. 18, 2005, the disclosure of which is incorporated here by reference.

Once captured and processed, however, the data needs to be communicated from, for example, a head-end portion of the system to, for example, a set-top box in a manner which enables sufficient data to be supplied to render rich user interfaces, while at the same time being sensitive to time delay and operating within the constraints imposed by legacy hardware. Accordingly, it would be desirable to provide architectures and methods which resolve these conflicting parameters and enable advanced user interfaces to be generated.

SUMMARY

Exemplary embodiments of the present invention provide methods and systems for communicating and processing data in communication networks, e.g., cable networks and/or interactive television networks. Selective use of different data streams and encoding techniques enable sophisticated user interfaces to be generated on client devices having varying processing capabilities.

According to one exemplary embodiment of the present invention, a method for transmitting data from an upstream node to a client device in a cable communication network includes the steps of selectively identifying data to be transmitted from the upstream node to the client device as either first data or second data, encoding the first data using MPEG encoding, transmitting the MPEG encoded data via an MPEG data stream to the client device, encoding the second data using a second type of encoding which is different than MPEG encoding and transmitting the encoded second data using a second data stream to the client device.

According to another exemplary embodiment of the present invention, a method for generating a hoverzoom effect on a user interface includes the steps of transmitting background layer data and foreground data to a client device, displaying the background layer, identifying a user action associated with the hoverzoom effect, displaying, in response to the user action, said foreground layer as an overlay on the background layer.

According to yet another exemplary embodiment of the present invention, a method for MPEG encoding data to be transmitted from an upstream node to a client device includes the steps of estimating motion vectors associated with a user interface, sending the motion vectors to an MPEG encoder, and MPEG encoding the data to be transmitted using the estimated motion vectors.

BRIEF DESCRIPTION OF THE DRAWINGS

The accompanying drawings illustrate exemplary embodiments of the present invention, wherein:

FIG. 2 depicts another screen of a user interface which can be generated using data processed in accordance with the present invention;

FIG. 3 is a table showing exemplary metadata types and sources;

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Figure 1A:
FIGS. 1(a) and 1(b) depict screens of a user interface showing a hoverzoom feature which can be generated using data processed in accordance with the present invention.
Figure 1B:

In order to provide some context for this discussion, exemplary user interface screens which can be created using data and instructions forwarded from a server to a client in accordance with exemplary embodiments of the present invention are shown in FIGS. 1(a) and 1(b). Therein, a portion of an exemplary user interface screen which can be generated based on information transferred to an end user's system (e.g., set-top box/television or personal computer) shows ten media selection items. For more information regarding this purely exemplary interface, including previous screens and navigation techniques, the interested reader is directed to the above-incorporated by reference U.S. patent application Ser. No. 10/768,432. It will be appreciated that such user interfaces are purely exemplary and that architectures and methods in accordance with the present invention can be implemented to support other interfaces.

FIG. 1 (a) shows a user interface screen having a plurality of media objects available for selection as images, e.g., DVD cover art. In FIG. 1(b), the image associated with the movie "Apollo 13" has been magnified as a result of a preliminary selection activity, e.g., a user passing a cursor (not shown) over this image on the display screen. This feature, referred to as a hoverzoom effect and described in more detail below under the heading "Hoverzoom", can be achieved by transmitting data (e.g., metadata) and instructions between nodes, e.g., a headend and a set-top box according to exemplary embodiments of the present invention. At lower levels of the user interface, additional data, e.g., metadata delivered from content providers, can be used to generate the user interface screen. For example, as shown in FIG. 2, user selection of this magnified image, e.g., by depressing a button on an input device (not shown), can result in a further zoom to display additional details. For example, information about the movie "Apollo 13" including, among other things, the movie's runtime, price and actor information is shown. Those skilled in the art will appreciate that other types of information could be provided here. Additionally, this GUI screen includes GUI control objects including, for example, button control objects for buying the movie, watching a trailer or returning to the previous GUI screen (which could also be accomplished by depressing the ZOOM OUT button on the input device). Hyperlinks generated from metadata processed in a manner described below can also be used to allow the user to jump to, for example, GUI screens associated with the related movies identified in the lower right hand corner of the GUI screen of FIG. 2 or information associated with the actors in this movie. In this example, some or all of the film titles under the heading "Filmography" can be implemented as hyperlinks which, when actuated by the user via the input device, will cause the GUI to display a GUI screen corresponding to that of FIG. 2 for the indicated movie. Some or all of the information used to generate the interface screens of FIGS. 1(a), 1(b) and 2 comes from metadata provided by one or more metadata providers and processed in accordance with exemplary embodiments of the present invention as will now be described.

The interface screens shown in FIGS. 1(a), 1(b) and 2 are purely exemplary and metadata (and other data) transferred and processed in accordance with the present invention can be used to support other interfaces or for purposes other than interface generation. Likewise, many different types of information can be received and processed in accordance with the present invention. Examples of metadata types, sources and associated uses, e.g., for a TV browser interface, a video-on-demand (VOD) interface or a music browser, are shown in the table of FIG. 3. Of particular interest for this detailed discussion are the zooming features associated with user interfaces generated in accordance with these exemplary embodiments of the present invention. Although the present invention is not limited to techniques or systems for generating zoomable user interfaces, some of the client/server features discussed herein are particularly beneficial for use in conjunction with user interfaces which include zooming transitions between user interface screens. For the purpose of this detailed description, the terms "zoom", "zoomable" and "zooming" refer to techniques wherein a user interface action results in changes to the displayed portion of the user interface that a creates a change of perspective which is consistent and informative to the user. Zooming will typically include changes in object magnification (e.g., camera-style zooming), but is expressly not limited thereto. For example, another aspect of zooming in accordance with user interfaces is semantic zooming which includes the modification of a zoomed object in a manner which is independent of magnification, e.g., the addition of text or a graphic to an object which was not present as part of the object (at any level of magnification) prior to the semantic zoom. For more information related to zoomable user interfaces, the interested reader is referred to the above-identified, incorporated by reference patent application.

For context, one example of a zooming transitions in accordance with exemplary embodiments of the present invention is the zooming transition between the user interface screen of FIGS. 1(a) and 1(b), which involves a magnification change of a hoverzoomed object and, optionally, semantic zooming to that object as well. Another example is found in the transition between the user interface screen of FIG. 1(b) and FIG. 2, wherein the image associated with "Apollo 13" has its magnification changed (e.g., enlarged in FIG. 2 relative to the similar image shown in FIG. 1(b)) and translated for use in FIG. 2. Panning effects can also be used to animate the zooming transition.

Figure 4:
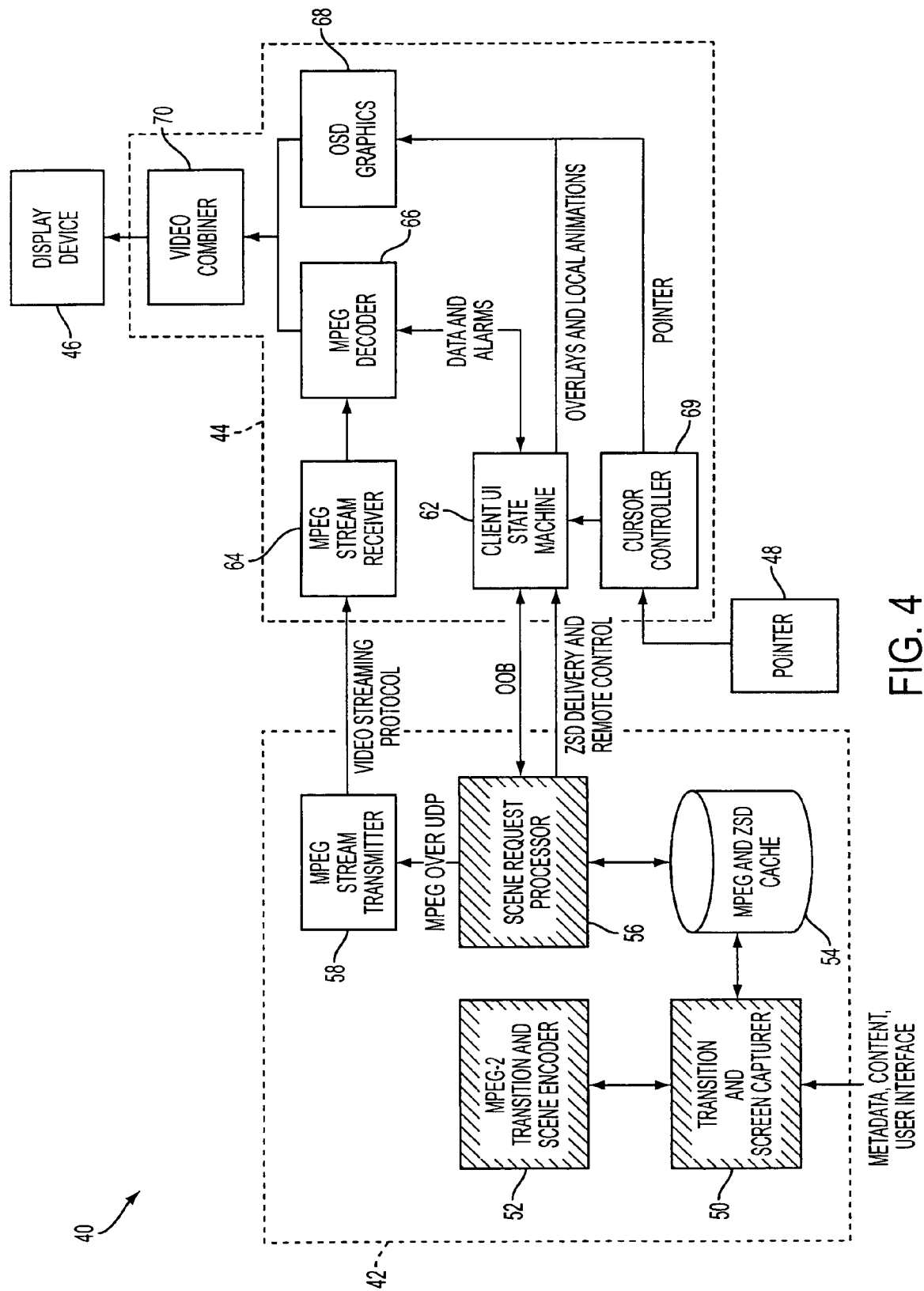
FIG. 4 shows a client-server architecture according to exemplary embodiments of the present invention.

A general client-server architecture 40 for providing data processing and transport according to an exemplary embodiment of the present invention is shown in FIG. 4. Therein, a user interface server 42 communicates with a client device 44 to generate a user interface on a display device 46 in conjunction with inputs from, for example, a pointing device 48. Communication of data, e.g., metadata and content data, between the user interface server 42 and the client device 44 can involve any number of intermediate nodes (not shown) between the user interface server 42 and the client device 44 including hubs, distribution servers, and the like. Moreover, some or all of the functional elements illustrated as being part of the user interface server 42 can be located within one or more of these intermediate nodes or reside at the headend of the system 40. The display device 46 can, for example, be a television, a computer monitor/display, or any other display device. The client device 44 can be embodied as a set-top box, a personal computer, or any other device including a processing unit. The pointer 48 can, for example, be a three-dimensional (hereinafter "3D") pointing device, a mouse, a remote control device, a track ball, a joystick, or any other device capable of providing a pointing capability and can be connected to the client device 44 either via wireline or wirelessly.

According to this exemplary embodiment of the present invention, the server 42 includes a transition and screen capturer 50, an MPEG-2 transition and scene encoder, an MPEG and ZSD cache 54, a scene request processor 56 and an MPEG stream transmitter 58, which components operate to generate and manage the streaming of MPEG-2 data to client devices 44, and to receive and respond to upstream requests from clients 44. The transition and screen capturer 50 automates the gathering of scene data used to generate the user interface. At a high level, this can be accomplished by navigating through, e.g., a scene graph provided as input to the transition and screen capturer 50, along with metadata and content, and calling the MPEG-2 transition and scene encoder 52 to generate MPEG-2 clips and scene description files associated with selected scenes to be displayed on display device 46. Detailed information associated with scene description files and formats (also referred to herein as "ZSD data") according to exemplary embodiments of the present invention is provided below under the header "Scene Description Data Format".

Navigation through the scene graph involves capturing and processing data associated with the various scenes which can be generated by the user interface. A "scene" as that term is used herein generally refers to the framework associated with any user interface screen which can be generated by the user interface which, despite the sophisticated and dynamic nature of user interfaces in accordance with the present invention, are all known a priori albeit at least some of the data used to populate the scenes will vary, e.g., over time as content providers change, for example, metadata associated with their offerings. Thus, although FIGS. 1(a), 1(b) and 2 show only portions of user interface screens, each of those complete screens would be considered to be a scene. Table 1 below lists exemplary data which can be collected for each transition and Table 2 lists exemplary data for each scene:

TABLE 1

Per-Transition Information

| Field | Description |
| --- | --- |
| From Scene ID | The scene ID of the starting scene |
| To Scene ID | The scene ID of the destination scene |
| Focus Command | The command to move the focus in interface to the icon, button, etc. that causes the transition when selected. An example of a focus command is to move the mouse pointer over an icon to cause it to focus. Another focus command could directly activate a hoverzoom effect. |
| Activation Command | This command activates the icon, button, etc. to start the transition from the "From Location" to the "To Location". |

TABLE 2

Scene Information

| Field | Description |
|---|---|
| Scene ID | The scene ID of the this scene |
| Location | The interface location instance for the starting scene |
| Scene Description | The user supplied description or an automatically generated description. |

The transition and scene capturer 50 is thus able to acquire all of the information necessary to simulate all desired transitions in the user interface from, for example, a database not shown in FIG. 4 which contains the complete user interface "universe". The transition and scene capturer 50 includes navigator controller and capture controller components which become active as a user generates inputs to the interface which command scene transitions. At a high level, the navigation controller has the responsibility of navigation to and from every transition and scene. An exemplary navigation controller performs the following operations, (1) obtain the next transition, (2) navigate to the "from" scene, (3) execute a focus command for this transition, (4) notify the capture controller with the scene and transition information, (5) execute the activation command, (6) notify the capture controller when the animation completes, (7) notify the capture controller with the scene and transition information reversed (for the back transition), (8) invoke a goBack( ) routine, and (9) notify the capture controller when the animation completes.

The capture controller integrates with the MPEG-2 transition and scene encoder 52 to create the MPEG-2 clips and ZSD files. The capture controller receives notifications from the navigation controller when the transition begins and ends and invokes routines on the MPEG-2 transition and scene encoder at every animation step. To provide a visual indication of the progress to the user, the capture controller ensures that the canvas still paints the visible scene graph to the scene and adds a text overlay that indicates the percent of transitions executed.

Figure 5:
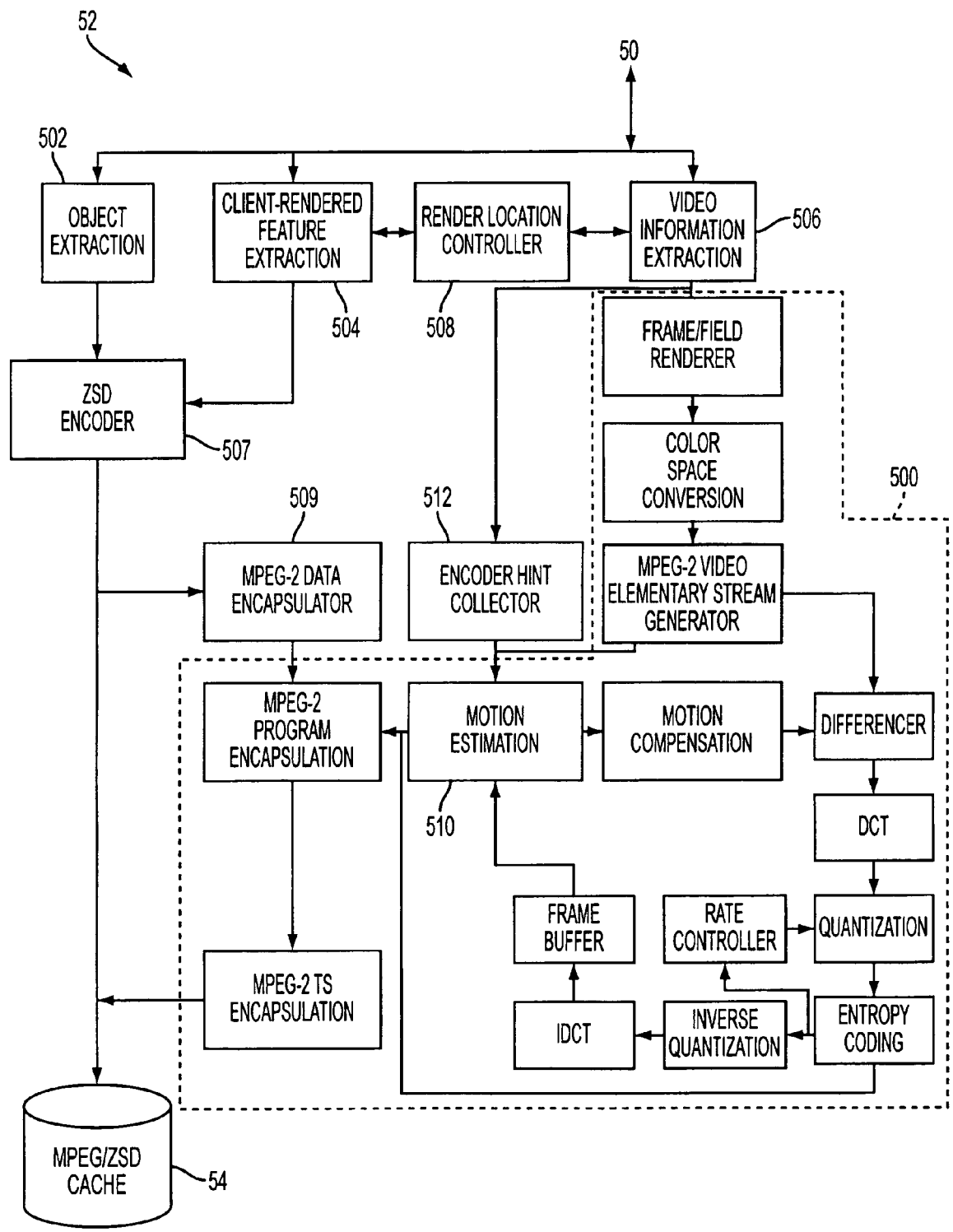
FIG. 5 illustrates the MPEG-2 transition and scene encoder of FIG. 4 in more detail in accordance with an exemplary embodiment of the present invention.

A detailed example of an MPEG-2 transition and scene encoder 52 according to an exemplary embodiment of the present invention is shown in FIG. 5. Raw scene data, e.g., images, text, metadata, etc., is delivered from the transition and screen capturer 50 and provided to an object extraction unit 502, a client-rendered feature extraction unit 504 and a video information extraction unit 506. The object extraction unit 502 (handling user-interactable objects on the user interface screens) and client-rendered feature extraction unit 504 (handling, e.g., hoverzoom and text, features to be rendered by the client device 44) operate, under the control of the render-location controller 508, to extract information from the raw data stream and provide it to the ZSD encoder 507, which encodes the extracted information using the scene description format described in detail below. None, some or all of the ZSD encoded data can be sent within the MPEG data stream, for example as part of the private data fields within MPEG frames, using MPEG-2 data encapsulator 509, while other ZSD encoded data can be transmitted using the OOB link described above with respect to FIG. 4.

The video information extraction unit 506 operates to extract video information suitable for MPEG-2 encoding, again under the control of the render location controller 508. The ability of render location controller 508 to selectively determine which type of encoding to apply to particular data, in this example MPEG or ZSD encoding, and the benefits associated therewith are described in more detail below with respect to FIG. 11.

As used herein, the term "MPEG encoding" is generic to MPEG-1, MPEG-2 and similar encodings, although some exemplary embodiments of the present invention do specifically refer to MPEG-2 encoding. General details associated with MPEG encoding per se will be known to those skilled in the art and are further available in the form of draft standards (e.g., ISO CD 11172). An exemplary MPEG-2 encoder 500 includes a plurality of unnumbered blocks which operate in accordance with the standard to perform MPEG-2 encoding (an exception being motion estimation unit 510 described in more detail below). One example of an MPEG encoder which provides a more detailed description of the unnumbered blocks of MPEG encoder 500 can be found in the various MPEG-2 standards documents, for example, Test Model 5 documents which evolved as a joint effort between ITU-T SG15.1 (known then as CCITT SG XV, Working Party XV/1, Experts Group on ATM Video Coding) and ISO/IEC JTC1/SC29 WG11 (MPEG). Specifically, the MPEG version of Test Model 5 is known as MPEG 93/225b and the ITU version of Test Model 5 is known as AVC -445b, the disclosures of which are incorporated here by reference. MPEG encoded data is stored in Of particular interest for exemplary embodiments of the present invention is the client user interface state machine 62, a more detailed example of which is provided in FIG. 7. The client user interface state machine 62 interprets scene data and/or scripts received from the scene request processor 56 to present user interface scenes (e.g., as shown in FIGS. 1(*a*), 1(*b*) and 2) on client devices 44. The client user interface state machine 62 can also retrieve scene data and MPEG-2 transition clips from either the headend 42 (as represented by block 700) or from a local hard disk drive 702. Those skilled in the art will appreciate that, depending upon the system and/or type of client device involved, that only one data source 700, 702 may be present in a particular implementation of the present invention or that some other type of data source can be used. Out-of-band (QOB) communications 704 can be used to provide signaling and commands to the client user interface state machine 62 via an operating system (OS) 706, e.g., PowerTV, Linux, Win32, etc., and operating system portal layer 708. The OS and OS porting layer 706, 708 can also track the user's activities with respect to the user interface and provide data to an event mapper function 710. Event mapper 710 translates user interface data, e.g., cursor movement, voice command input, motion of 3D pointer, etc., into events which may require some change in the user interface, e.g., display change, audio change, zooming transition, etc. For example, when the user's cursor hovers over or passes over the image of "Apollo 13" in FIG. 1(*a*), the event mapper 710 would receive raw cursor data from the OS and map that into, for example, a hoverzoom event which results in that image being slightly magnified as illustrated in FIG. 1(*b*) and described in more detail below. As another example, if the OS 706, 708 passed a button click through to the event mapper 710 while the cursor was positioned over the magnified version of the "Apollo 13" image in FIG. 1(*b*), indicating that the user wanted more detail regarding this movie, then the event mapper 710 could identify a "transition to detailed view event" associated therewith, leading to a transition to the user interface screen of FIG. 2.

In order to accommodate random object movement to support all types of, e.g., video data compression, standard MPEG motion estimation algorithms perform a search for blocks of pixel data determine which blocks of pixels have moved (and in which direction) from frame to frame. For example, some searches, call full pel searches, use 16×16 blocks, while others, called half-pel searches, use 16×8 blocks. These searches can become computationally expensive, particularly for high definition video data, and has been estimated to require up to 80% of the processing time/power associated with the operations performed by a standard MPEG encoder 500 (e.g., without the modifications introduced by the encoder hint collector 512). Thus, according to exemplary embodiments of the present invention, motion estimation associated with MPEG encoding is simplified using the fact that the user interface being generated by these client/server architectures does not involve random movement of objects. For example, in transitioning between the exemplary user interface screens of FIG. 1(b) and 2, the image associated with "Apollo 13" moves from a first position on a display screen to a second position on a display screen (optionally with some magnification), both positions being known a priori to the encoder hint collector 512, which can calculate an MPEG motion vector therefrom.

Thus, the encoder hint collector 512 can pass the MPEG motion vector to motion estimation unit 510 with a command to use the passed motion vector for performing MPEG compression rather than performing a search in accordance with standard MPEG techniques. However, this use of knowledge of interrelated user interface screens to generate MPEG motion vectors may not always be able to generate a valid MPEG motion vector (e.g., due to limitations on the number of bits assigned for expressing MPEG motion vectors). Accordingly, encoder hint collector 512 also has the capability to command motion estimation unit 510 to employ the standard MPEG search algorithm to determine motion vectors on a frame-by-frame (or other) basis. In addition to either (1) using motion vectors which are generated entirely using the standard MPEG search algorithm or (2) using motion vectors which are generated entirely by the encoder hint generator 512 without use of the standard MPEG search algorithm, a third category of motion vectors which can be determined in accordance with the present invention are those which are calculated by the standard MPEG search algorithm having a search range which is limited in range based on the information available to the encoder hint collector 512.

Figure 6:
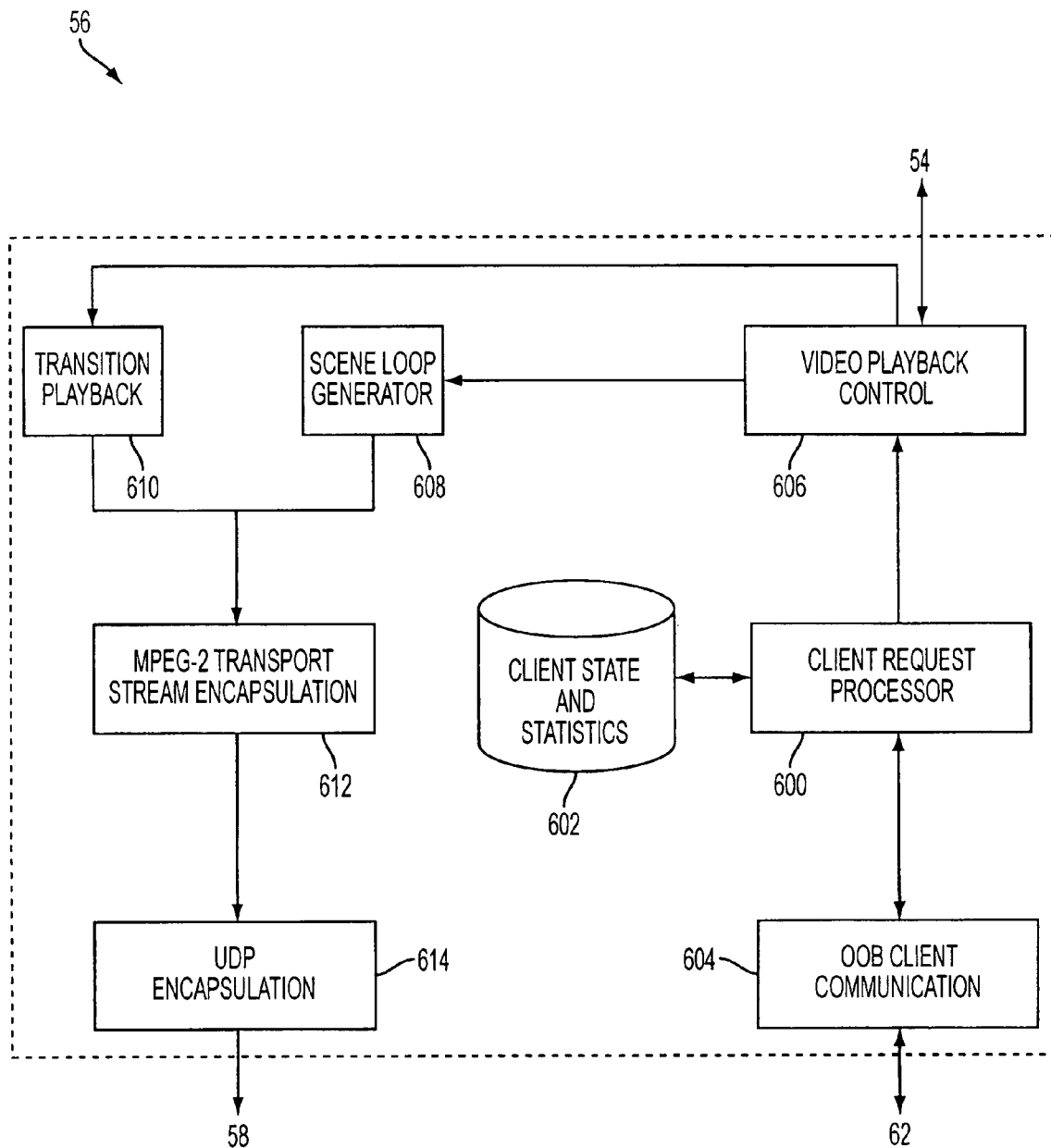
FIG. 6 illustrates the scene request processor of FIG. 4 in more detail in accordance with an exemplary embodiment of the present invention.

Referring back again to FIG. 4, MPEG data and scene description data generated by blocks 50 and 52 can be cached in memory device 54 for retrieval as needed by the scene request processor 56. The scene request processor 56 processes requests for scenes from client 44, e.g., if the client user interface state machine 62 receives an indication that the cursor associated with pointer 48 has paused over the image associated with "Apollo 13" (FIG. 1), then a request is sent back to scene request processor 56 to initiate a hoverzoom scene (described below) or if the client user interface state machine 62 receives an indication that the user wants to view a more detailed scene associated with "Apollo 13" (FIG. 2), then a request is sent back to scene request processor 56 to initiate that scene. The scene request processor 56 returns MPEG-2 transitions and scene description data back to the client 44 in response to the upstream requests. According to exemplary embodiments described in more detail below, for certain upstream requests the scene request processor 56 may dynamically determine whether MPEG data, scene description data or some combination of both is appropriate to service the requests. A detailed example of the scene request processor 56 is illustrated in FIG. 6.

Therein, the client request processor 600 coordinates all client interaction, e.g., by interpreting client requests and dispatching those requests to the appropriate components within scene request processor 56. For example, the client request processor tracks states and statistics on a per-client basis and stores such information in database 602. An out-of-band (OOB) client communication component 604 handles all communication with clients over OOB channels, including responding to connection requests and extracting protocol requests. The video playback control function 606 coordinates the operation of the MPEG-2 stream generation components, e.g., the scene loop generator 608 and the transition playback function 610. The scene loop generator 608 component generates loops of the user interface scenes and transmits them when no transitions occur. The transition playback function 610 loads MPEG-2 transition streams that were previously generated by the MPEG-2 transition and scene encoder 52 (e.g., via cache 54) and streams them to the requested client. The transition playback function 610 may serve multiple streams simultaneously. The MPEG-2 transport stream encapsulation unit 612 updates the MPEG-2 transport stream as appropriate and forwards the stream to the UDP encapsulation unit 614 which groups MPEG-2 transport stream packets together and sends them over UDP to a IP to QAM gateway (not shown) in the MPEG stream transmitter 58.

Referring again to FIG. 4, MPEG stream transmitter 58, on the server side, and MPEG stream receiver 64 and MPEG decoder 66, on the client side, enable the communication of both metadata, e.g., data used to populate the text fields shown in the user interface screen of FIG. 2, and content via a video streaming protocol link. The MPEG transmitter 58, receiver 64 and decoder 66 can be implemented using off-the-shelf components and, accordingly, are not described in detail herein. However readers interested in more details relating to these elements, as well as other exemplary interactive television system architectures in which the present invention can be implemented, are referred to U.S. Pat. No. 6,804,708 to Jerding et al., the disclosure of which is incorporated here by reference. The on-screen display (OSD) graphics controller 68 receives data scene data from the client state machine 62 and input from the cursor controller 69 to generate overlay graphics and local animations, e.g., zooming transitions, for the user interface. The MPEG video data and the OSD video data output from decoder 66 and OSD graphics controller 68, respectively, are combined by video combiner 70 and forwarded to display device 46 to generate the user interface. As mentioned above, the DVD cover art images shown in FIG. 1(a) are examples of user interface elements created using MPEG video data, while the zoomed version of the "Apollo 13" image in FIG. 1(b) and the circular icons in the upper right hand corner of the user interface screen of FIG. 1(a) are examples of user interface elements generated using scene description data.

Figure 7:
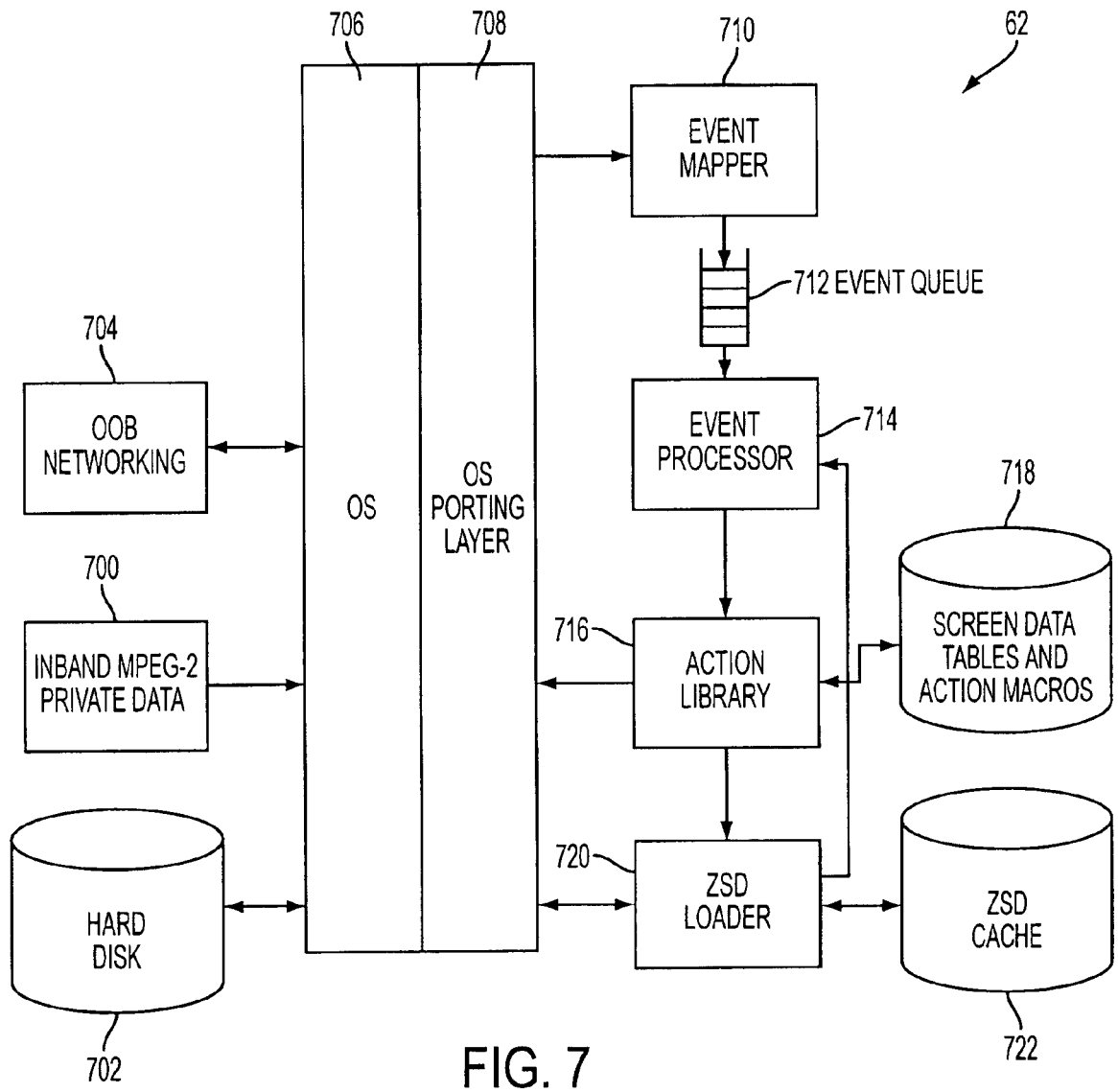
FIG. 7 illustrates the client UI state machine of FIG. 4 in more detail in accordance with an exemplary embodiment of the present invention.

Of particular interest for exemplary embodiments of the present invention is the client user interface state machine 62, a more detailed example of which is provided in FIG. 7. The client user interface state machine 62 interprets scene data and/or scripts received from the scene request processor 56 to present user interface scenes (e.g., as shown in FIGS. 1(a), 1(b) and 2) on client devices 44. The client user interface state machine 62 can also retrieve scene data and MPEG-2 transition clips from either the headend 42 (as represented by block 700) or from a local hard disk drive 702. Those skilled in the art will appreciate that, depending upon the system and/or type of client device involved, that only one data source 700, 702 may be present in a particular implementation of the present invention or that some other type of data source can be used. Out-of-band (OOB) communications 704 can be used to provide signaling and commands to the client user interface state machine 62 via an operating system (OS) 706, e.g., PowerTV, Linux, Win32, etc., and operating system portal layer 708. The OS and OS porting layer 706, 708 can also track the user's activities with respect to the user interface and provide data to an event mapper function 710. Event mapper 710 translates user interface data, e.g., cursor movement, voice command input, motion of free space pointer, etc., into events which may require some change in the user interface, e.g., display change, audio change, zooming transition, etc. For example, when the user's cursor hovers over or passes over the image of "Apollo 13" in FIG. 1(*a*), the event mapper 710 would receive raw cursor data from the OS and map that into, for example, a hoverzoom event which results in that image being slightly magnified as illustrated in FIG. 1(*b*) and described in more detail below. As another example, if the OS 706, 708 passed a button click through to the event mapper 710 while the cursor was positioned over the magnified version of the "Apollo 13" image in FIG. 1(*b*), indicating that the user wanted more detail regarding this movie, then the event mapper 710 could identify a "transition to detailed view event" associated therewith, leading to a transition to the user interface screen of FIG. 2.

Events detected by event mapper 710 are queued in the event queue 712 for processing by event processor 714. The event processor 714 coordinates the activities of the client user interface state machine 62 by receiving events from the event queue 712 and dispatching them to the action library 716 based on, for example, the currently active scene data and/or script. The action library 716, in conjunction with a scene data loader 720 and various storage units 718, 722, operates to generate the change(s) to the currently displayed user interface screen based on the detected event as will be described in more detail below with respect to the discussion of scene data.

Scene Description Data Format

Having described some exemplary server/client architecture for generating user interfaces according to exemplary embodiments of the present invention, a second exemplary data format (in addition to MPEG/MPEG-2) which can be used in conjunction with this architecture will now be described. Although other data formats can be used in conjunction with the present invention, this exemplary data format effectively creates a state machine that enables the client device 44 to respond to user interactions and system events. This data format is arbitrarily extensible to support both very low powered client devices 44 and high end client devices 44, e.g., PCs. Other goals of this exemplary scene data format (also referred to as "ZSD") include theme support, future language support, demo scripting, and automated test support.

The ZSD format supports two types of scenes: the exclusive scene and overlay scenes. Herein, the exclusive scene is referred to simply as the scene, since it occupies the full screen and contains the primary user interaction elements. Overlay scenes describe full or partial scenes that the client user interface state machine 62 logically overlays on top of the exclusive scene. While the exclusive scene changes as the user navigates, the overlay scenes may or may not change. This enables them to support features such as music controls, global navigation, bookmarks, etc., that follow the user as they navigate from exclusive scene to scene. Exclusive scenes launch overlay scenes initially, but overlay scenes may launch other overlays. Although it is possible to terminate all overlay scenes, the overlay scenes control their own lifetime based on interaction from the user or based on the current exclusive scene.

The exclusive scene and all overlay scenes logically exist in their own namespaces. In order for ZSD elements to refer to elements in other scenes, ZSD references as described herein could be modified to include a field to specify the namespace. Inter-scene communication is useful for operations such as notifying overlay scenes what is in the exclusive scene. To support inter-scene communication, the sender triggers actions to generate events. These events are then dispatched by the event processor 714 to each scene. When the event contains a Resource ID, that ID is mapped to an equivalent resource in the destination scene. If the destination scene does not contain an equivalent resource, the event processor 714 moves on to test dispatching the event to the next scene.

Figure 8:
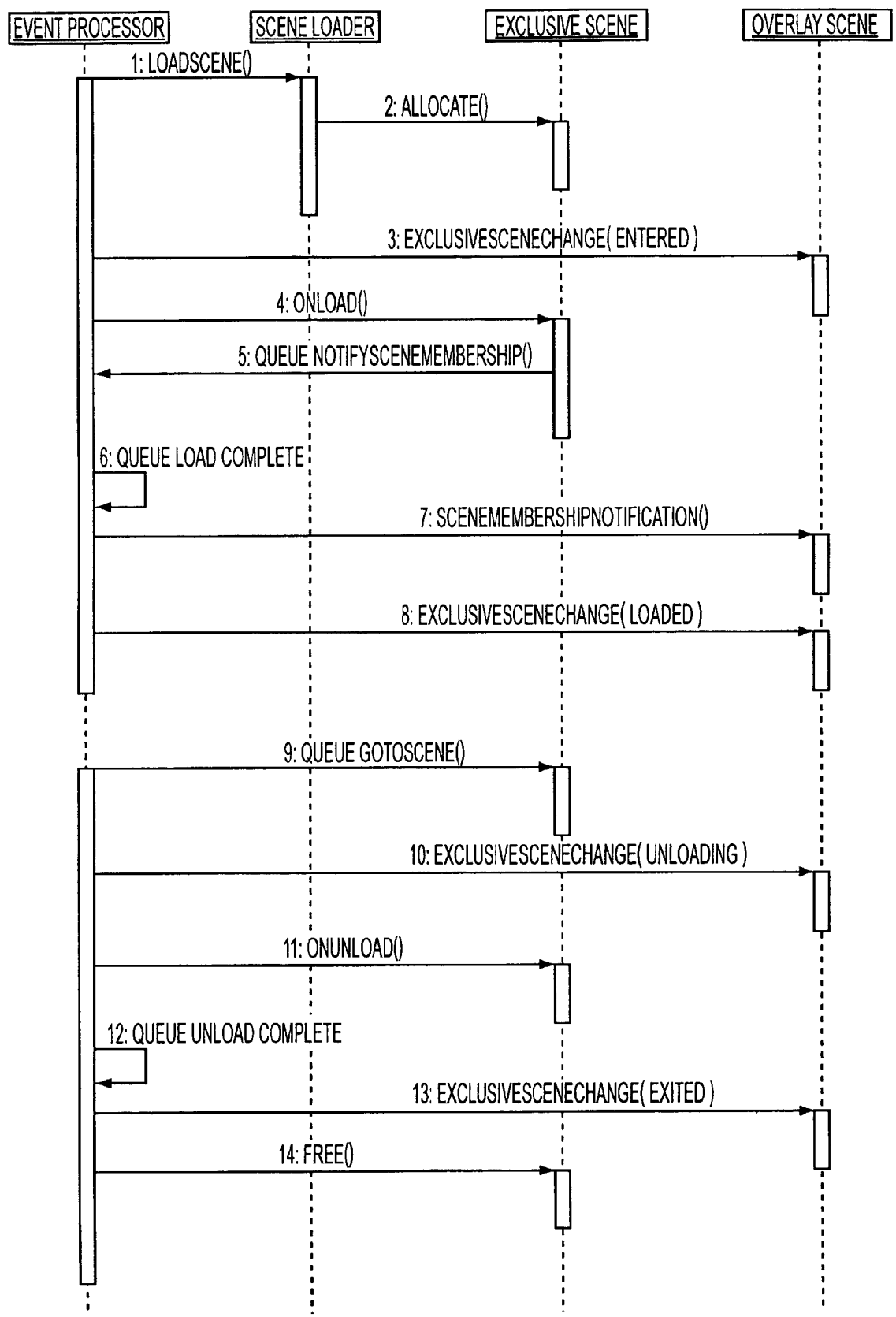
FIG. 8 depicts an exemplary messaging interaction between an event processor, scene loader, exclusive scene and overlay scene in accordance with an exemplary embodiment of the present invention.

Every exclusive scene passes through the following states sequentially on the client, (1) Entered, (2) Loaded, (3) Steady State, (4) Unloading and (5) Exited. When the exclusive scene's ZSD data is initially decoded, the scene enters the Entered state. At this point, the event processor 714 fires the OnLoad event so that the exclusive scene can perform any initial actions. Once the event processor 714 completes the OnLoad event dispatch process, the exclusive scene enters the Loaded state. At this point, the event processor 714 may have pending events in its queue 712. The event processor 714 clears out this queue 712 and then transitions the exclusive scene to its Steady State. FIG. 8 illustrates an exemplary exclusive scene life cycle using scene membership messaging to show event processing in all states. The process for unloading an exclusive scene is essentially the reverse of the load process. For this case, a GoToScene or other scene-changing action initiates the unload process. At this point, the exclusive scene changes to the Unloading state. Once all ZSD unload processing completes, the process transitions to the Exited state, wherein the client may optionally retain some or all of the exclusive scene's ZSD data. The changes in the exclusive scene's state are communicated to all currently loaded overlay scenes so the overlay scene can take action (if needed).

Figure 9:
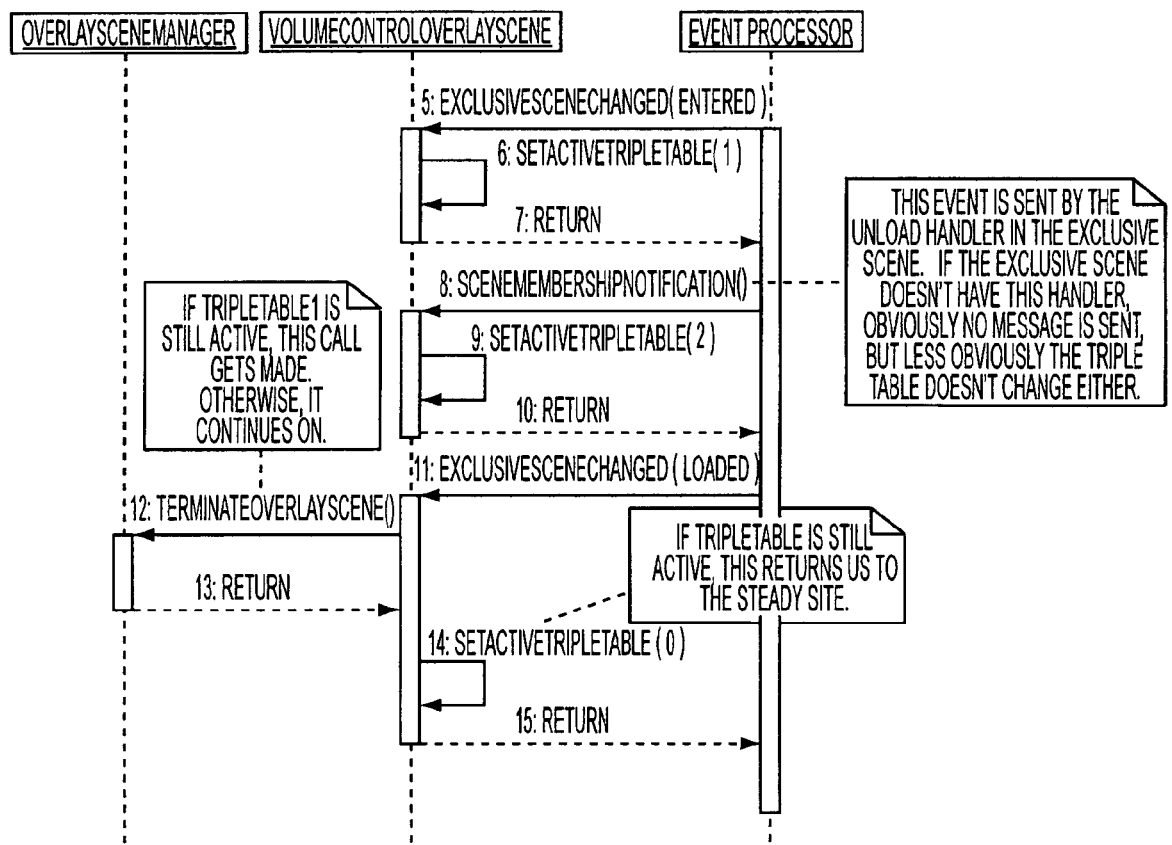
FIG. 9 shows another exemplary messaging interaction associated with architecture and methods in accordance with the present invention.

Overlay scenes exist independent and on top of the exclusive scene. For example, in FIG. 1(*a*) the three icons depicted in the upper righthand corner (home, up arrow and TV) can be implemented as overlay scenes on the exclusive scene (the images of various DVD covers, implemented in the MPEG layer). Another example, not shown in FIGS. 1 and 2, is the provision of volume control and/or channel selection user interface objects as overlay scenes. Termination of an overlay scene can be accomplished from within the scene itself, or by request from the exclusive scene. Additionally, SceneMembershipNotifcation events can be used to limit the lifetime of an overlay scene to a particular set of exclusive scenes as shown, for example, in FIG. 9. Each of the exclusive scenes that belong to this scene group would send a SceneMembershipNotification message when they are loaded. The overlay scene associated with this scene group would use the ExclusiveSceneChange events and the SceneMembershipNotification message to tell if the overlay scene should stay loaded or should terminate itself. As long as it receives a SceneMembershipNotifaction that matches its Scene Group, the overlay screen can stay loaded. Triple tables (mentioned in FIG. 9) are described in more detail below.

According to one exemplary embodiment of the present invention, each scene contains the following descriptive information:

TABLE 3

Scene Information Fields

| Field | Description |
| --- | --- |
| Scene ID | A globally unique ID for this scene |
| Description | An optional string description to help identify this scene to a developer |
| SceneDimension | The dimensions used to layout the scene |
| ZSD Format Version | This field has the integer value one. |
| ZSD Profile | This field is the name of the minimally supported profile. Currently it can take on the value "Simple" and "Advanced". |
| Maximum Action Stack Size | This field specifies the maximum number of elements that may be pushed onto the Action Stack for this scene. |
| Cache Property Type | This field specifies how a ZSD interpreter may cache this scene. |
| Cache Property Value | This field can be used to specify a 32 bit integer value based on the Cache Property Type. It should be set to 0 if unused. |

In order to improve ZSD load time performance, a client device 44 may optionally implement a ZSD cache 722. ZSD-encoded scenes specify caching properties to direct clients when the caching behavior is no longer useful. For example, temporally important information such as sports scores should not be cached for a long period of time. Table 4 lists exemplary caching properties types and describes their use.

TABLE 4

Cache Properties

| Cache Property Type | Description | Property Value Units |
| --- | --- | --- |
| Timeout | Time out this scene after the specified number of seconds. (0 seconds implies no caching) | Seconds |

An exemplary scene data format according to the present invention has four fundamental data types (sometimes referred to herein as "elements"), specifically objects, events, actions, and resources. At a high level, objects describe scene components such as the bounds for buttons and icons in the MPEG layer, overlay text, and overlay images. Events describe the notifications that are pertinent to the scene. These include mouse (pointer) move events, keyboard events, application state change events, etc. Actions describe responses to events such as going to another scene, and finally, resources contain the raw data used by objects, events, and actions, e.g., image data. Each of these data types are described in more detail below.

Exemplary object types and parameters associated therewith (including an optional set of properties) according to an exemplar embodiment of the present invention are described in tables 5-8.

TABLE 5

Object Types

| Object Type | Value | Parameters | Description |
| --- | --- | --- | --- |
| WholeScene | 0 | None | The whole scene object, OID 0, has this type. |
| Bounds | 1 | X, Y, Width, Height | This object specifies a rectangular bound in the scene coordinate system. |
| PNode | 2 | X, Y, Width, Height, Parent Object | This object specifies a PNode with the specified bounds |

TABLE 6

Reserved Object IDs

| Name | Object ID | Type | Description |
| --- | --- | --- | --- |
| WholeScene | 0 | WholeScene | The whole scene |
| Reserved | 1-63 | N/A | Reserved |

TABLE 7

Object Type Support

| Object Type | Simple Profile | Advanced Profile |
| --- | --- | --- |
| WholeScene | ✓ | ✓ |
| Bounds | ✓ | ✓ |
| PNode | x | ✓ |

TABLE 8

Object Properties

| Property Type | Parameters | Required For: | Optional For: |
| --- | --- | --- | --- |
| Cursor | Cursor Resource ID | WholeScene | Bounds, PNode |

Like the other scene description format elements, each event is assigned a globally unique value. Some event types employ filters to constrain the actions that they would trigger. For example, the OnKeyPress event uses the key of interest.

In addition to filters, events can push resources onto the action stack, described below. Actions may use the information on the stack to modify their behavior.

Exemplary event types are listed in Table 9 below. Overlay scenes affect the propagation of events by the dispatcher. Dispatch semantics are abbreviated in the table as follows:

1. Active—the dispatcher sends the event only to the active scene. For example, when a scene is loaded, the OnLoad event only gets sent to that scene.
2. Scenes with Resource Filters—the dispatcher only sends these events to scenes that contain Resource Table entries for the event. Before iterating through a scene's triple table, the event dispatcher remaps the Resource IDs in the event to their equivalents in the scene.
3. Overlays Only—the dispatcher only sends these events to overlay scenes.
4. Both—the dispatcher first sends this event to the overlay scenes and then to the exclusive scene

TABLE 9

Event Types

| Event Type | Value | Semantics | Filter | Action Stack | Description |
| --- | --- | --- | --- | --- | --- |
| OnLoad | 0 | Active | None | None | This event gets sent when the object gets loaded. |
| OnKeyPress | 1 | Both | Key | Key | This event gets sent when the user presses a key or remote control button. |
| OnKeyRelease | 2 | Both | Key | Key | This event gets sent when the user releases a key or remote control button. |
| OnKeyTyped | 3 | Both | Key | Key | This event gets sent when the user types a key. If the key supports auto-repeat, the system sends this event repeatedly while the key is down. |
| OnMouseEnter | 4 | Both | None | None | This event gets sent when the mouse pointer goes over the object. |
| OnMouseExit | 5 | Both | None | None | This event gets sent when the mouse pointer exits the bounds of the object. |
| OnMousePress | 6 | Both | Button | X, Y, Button | This event gets sent when the user presses a mouse button. |
| OnMouseRelease | 7 | Both | Button | X, Y, Button | This event gets sent when the user releases a mouse button. |
| OnMouseClick | 8 | Both | Button | X, Y, Button | The event gets sent when the user presses and releases a mouse button. |
| OnFocusIn | 9 | Both | None | None | This event gets sent when the associated object receives focus. Other events generally cause focus such as key presses and mouse enter. |
| OnFocusOut | 10 | Both | None | None | This event gets sent when the associated object loses focus. |
| OnSceneMembershipNotification | 11 | Scenes with Resource Arguments | SceneMembership Resource ID | SceneMembership Resource ID | This event gets sent when a NotifySceneMembership action gets fired. |
| OnScrollUp | 12 | Both | Wheel | Wheel | This event gets fired for every notch that the specified scroll wheel moves up. |
| OnScrollDown | 13 | Both | Wheel | Wheel | This event gets fired for every notch that the specified scroll wheel moves down. |
| OnTimeout | 14 | Both | Timer | Timer | This event gets fired when a timer expires. |
| OnActivate | 15 | Both | None | None | This event gets fired when an object gets activated. |
| OnExclusiveSceneChange | 16 | Overlays Only | Entered, Loaded, Unloading, Exited | None | This event gets fired when the exclusive scene changes. The argument specifies the exact moment in the scene change. See the scene the scene life cycle sequence diagram. |

TABLE 9-continued

Event Types

| Event Type | Value | Semantics | Filter | Action Stack | Description |
|---|---|---|---|---|---|
| OnUnload | 17 | Both | None | None | This event gets fired when an object gets unloaded as the result of a scene change. |

In operation of the architectures and methods described herein, the result of an event on an object is an action. Actions may be linked together in a ZSD Action Table to form programs. To facilitate parameter passing to actions from events and to linked actions, a ZSD interpreter maintains an action stack. The action stack is initialized before dispatching the first action in an action list with the following items in order:
1. The object in the triple table entry that triggered the action
2. The event in the triple table entry that triggered the action
3. Elements pushed onto the action stack from the event Before dispatching each action, the ZSD interpreter logically pushes the parameters of the action onto the stack. Implementations may short-circuit this behavior on built-in actions for simplicity. Each action type specifies its use of the stack. In general, a ZSD interpreter will only be able to allocate a small action stack (e.g. 16-32 elements), so stack usage should be kept to a minimum. To ensure that the ZSD interpreter always has a sufficient stack, the ZSD encoder must specify the maximum stack size in the header. All action types should avoid recursion to simplify the maximum stack size calculation. Exemplary action types are listed below in Table 10.

TABLE 10

Action Types

| Action Type | Value | Parameters | Action Stack | | Post Stack Delta | Description |
| | | | Inputs | Outputs | | |
|---|---|---|---|---|---|---|
| NoAction | 0 | None | None | None | 0 | This action is a NOP. |
| GoToScene | 1 | Scene ID, Duration | Parameters | None | −2 | This action causes the client to animate to a new location in the specified time. If the server context buffer has information, this command bundles the context with the scene navigation request. |
| NavigateBack | 2 | Count | Parameters | None | −1 | Navigate the specified number of scenes back in history. If the history does not contain that many scenes, it navigates back as far as possible. If the server context buffer has information, this command bundles the context with the scene navigation request. |
| NavigateForward | 3 | Count | Parameters | None | −1 | Navigate the specified number of scenes forward in history. It the history does not contain that many scenes, it navigates forward as far as possible. If the server context buffer has information, this |

TABLE 10-continued

Action Types

| Action Type | Value | Parameters | Action Stack Inputs | Outputs | Post Stack Delta | Description |
|---|---|---|---|---|---|---|
| | | | | | | command bundles the context with the scene navigation request. |
| NavigateHome | 4 | None | None | None | 0 | Navigate to the home scene. If the server context buffer has information, this command bundles the context with the scene navigation request. |
| NavigateUp | 5 | Count, Duration | Parameters | None | −2 | Navigate to the scene that is geographically up n times in the specified time. If the server context buffer has information, this command bundles the context with the scene navigation request. |
| StartTimer | 6 | Timer, Duration | Parameters | None | −2 | Start a timer that sends a timeout event in the specified duration. Timers are global to the scene. |
| StopTimer | 7 | Timer | Parameters | None | −1 | Stop the specified timer. |
| StartHoverZoom | 8 | X, Y, Width, Height, Resource ID, Duration | Parameters | None | −7 | Hoverzoom to the end coordinates (x, y, width, height) over the specified duration, using the Resource ID associated with a HoverZoomPixelData resource to create the HoverZoom. |
| StopHoverZoom | 9 | Duration | Parameters | None | −1 | Stop the hoverzoom over the specified number of millisecond |
| Focus | 10 | Object ID | Parameters | None | −1 | Force the focus to change to the specified object. |
| ChangePointer | 11 | Resource ID, Object ID | Parameters | None | −2 | Change the pointer to that specified by the Resource ID when over the object specified by the Object ID. |
| ChangePointerVisibility | 12 | Visible, Duration | Parameters | None | −2 | True to show the pointer; false to hide it. Animate for specified duration. |
| MovePointer | 13 | X, Y, Duration | Parameters | None | −3 | Move the pointer to the specified location over the specified duration. |
| Activate | 14 | Object ID | Parameters | None | −1 | Activate the specified object. |
| PushServerContext | 15 | Resource ID | Parameters | None | −1 | Push the specified resource for transmission back to the server. |

TABLE 10-continued

Action Types

| Action Type | Value | Parameters | Action Stack Inputs | Action Stack Outputs | Post Stack Delta | Description |
|---|---|---|---|---|---|---|
| ReportServerContext | 16 | None | None | None | 0 | Report the gathered context to the server. If no pending context, then this action is ignored. After the report, this command clears the context buffer. |
| CreateTextObject | 17 | Object ID, Resource ID | Parameters | None | −2 | Show the text object specified by the Resource ID using the Object specified by the Object ID |
| CreateImageObject | 18 | Object ID, Resource ID | Parameters | None | −2 | Show the image specified by the Resource ID using the Object specified by the Object ID |
| NotifySceneMembership | 19 | SceneMembership Resource ID | Parameters | None | −2 | Notify scene membership. This is usually done in response to an OnLoad event. |
| StartOverlayScene | 20 | Overlay Scene Resource ID | Parameters | None | −2 | Load and start the specified overlay scene. |
| TerminateOverlayScene | 21 | None | None | None | 0 | Terminate the current overlay scene. Triggering this action from the main scene does nothing. |
| TerminateAllOverlayScenes | 22 | None | None | None | 0 | Terminate all overlay scenes. This action is useful for resyncing client and server state. |
| SetActiveTripleTable | 23 | Triple Table Index | Parameters | None | −1 | Set the active Triple Table. Index 0 is the set by default. |
| RunScript | 24 | Resource ID | Parameters | 0+ | Arbitrary | Interpret the specified script |

Exemplary resources which can be used in conjunction with the present invention are listed below in Table 11.

TABLE 11

Resource Types

| Resource Type | Value | Parameters | Description |
|---|---|---|---|
| UTF8String | 0 | UTF8String | This resource type holds string characters from the UTF8 character set. The string may not exceed 256 characters. |
| UnicodeString | 1 | UnicodeString | This resource type holds Unicode characters. The string may not exceed 256 characters. |
| MPEG2TransitionClip | 2 | Scene ID, Scene ID, MPEG-2 clip | This resource type points to an MPEG-2 clip file for the transition between the two scenes. Scenes list all of the MPEG-2 clips for clients with hard disk support or for servers. These clips may change based on the current theme. |
| Cursor | 3 | Image | This resource holds the cursor image. |
| Image | 4 | Image | This resource holds an image. |

TABLE 11-continued

Resource Types

| Resource Type | Value | Parameters | Description |
| --- | --- | --- | --- |
| HoverZoom | 5 | PixMask, FGTransPix, FGOpaquePix, BGPix | This resource holds the image data for creating a hoverzoom. |
| SceneMembership | 6 | UTF8String | This resource identifies a scene's members such as belonging to a application. |
| OverlayScene | 7 | Scene | This resource holds an embedded ZSD description for an overlay scene. |

According to an exemplary embodiment of the present invention, the scene description format group's all scene interaction information into five tables: the object table, the event table, the action table, the resource table and one or more triple tables as described below in Tables 12-17. This division into tables eliminates most redundant information and enables quick lookup of interaction behavior on low end clients 44.

TABLE 12

ZSD Tables

| Table | Description |
| --- | --- |
| Object Table | This table lists all of the objects in the scene. Objects may be high level entities such as PNodes or just regions on the scene. |
| Event Table | This table lists all events that need processing on this scene. A client may ignore any event not listed in this table. |
| Action Table | This table lists all actions that can be invoked on objects on this scene. |
| Resource Table | This table contains strings and images. Its main use is to decouple the string and image data from the above tables so that it is trivial for the server to switch themes and languages. |
| Triple Table | This table associates objects, events, and actions. A ZSD encoding may include more than one triple table and use actions to switch between the active one. This enables the creation of state machines within a scene. |

TABLE 13

Object Table Fields

| Field | Description |
| --- | --- |
| Object ID | A unique ID for this object. OID number 0 represents the whole scene. |
| Object Type | The type of the object |
| Description | An optional string description to make the XML clearer |
| Parameters | Additional parameters that describe the object |

TABLE 14

Event Table Fields

| Field | Description |
| --- | --- |
| Event ID | A unique ID for this event |
| Event Type | The type of the event |
| Description | An optional string description to make the XML clearer |
| Parameters | Additional parameters that describe the event |

TABLE 15

Action Table Fields

| Field | Description |
| --- | --- |
| Action ID | A unique ID for this action |
| Action Type | The type of the action |
| Next Action | The Action ID of the next action to run. Specify the NoAction instance to stop executing actions. It is illegal to specify a loop of actions. |
| Description | An optional string description to make the XML clearer |
| Parameters | Additional parameters that describe the action |

TABLE 16

Resource Table Fields

| Field | Description |
| --- | --- |
| Resource ID | A unique ID for this resource |
| Theme ID | The theme ID for this resource |
| Language ID | The language ID for this resource |
| Resource Type | The type of the resource |
| Description | An optional string description to make the XML clearer |
| Parameters | Additional parameters that describe the resource |

TABLE 17

Triple Table Fields

| Field Type | Description |
| --- | --- |
| Object ID | The triple's object |
| Event ID | The event to monitor |
| Action ID | The action to invoke upon receiving the event |
| Boolean | True to terminate event processing if this triple matches an event |
| Description | An optional string description to make the XML clearer |

Various additional information regarding an exemplary scene data format according to the present invention can be found in the above-incorporated by reference priority application.

Client devices 44 without local storage request scenes and transitions from the server 42. An exemplary set of messages which can be used to perform this function is provided below in Table 18. The client/server link can, for example, be made over an Ethernet connection, QPSK channels (used by cable networks currently for OOB communications) or any other protocol or type of connection. Those skilled in the art will appreciate that this message set is purely exemplary and that messages can be added or deleted therefrom.

TABLE 18

Client-Server Messages

| Message Name | ID | Source | Description |
|---|---|---|---|
| RequestScene | 0 | Client | Request the specified scene. |
| RequestSceneAck | 1 | Server | Acknowledgment that the server is sending the requested scene. |
| SceneDetails | 2 | Server | The server may send this to the client if it does not send scene details in-band with the MPEG-2 scene transitions |
| DebugControl | 3 | Server | The server sends this message to enable/disable debug logging and remote control support on the client. |
| LogMessage | 4 | Client | Log a text message. The client only sends this message in debug mode. |
| NotifyEvent | 5 | Client | Notify that an event has occurred. The client only sends this message in debug mode. |
| NotifyAction | 6 | Client | Notify that an action has been fired. The client only sends this message in debug mode. |
| NotifyTriple | 7 | Client | Notify that a triple table entry matched. The client only sends this message in debug mode. |
| GenerateEvent | 8 | Server | Generate and fire the specified event on the client. These events will be fired event in lockout mode. The client only accepts this message in debug mode. |
| Lockout | 9 | Server | Lockout/unlock all user-generated events on the client. Example events include mouse and keyboard events. The client only accepts this message in debug mode. |
| Identity | 10 | Client | The client sends this message every time that it establishes a connection with the server to identify itself. |
| NotifyServerContext | 11 | Client | The client sends this message when its server context buffer is not empty and an action command invokes a server notification or request. |
| RequestScreenCapture | 12 | Server | The server sends this message to request that the client take a snapshot of the screen and send it back to the server in a ScreenCapture message. |
| ScreenCapture | 13 | Client | This is the response message to RequentScreenCapture. It contains the snapshot. |

Hoverzoom

As mentioned above, one feature of exemplary client-server architectures and methods according to the present invention is to provide the capability for sophisticated user interfaces to be generated at the client-side, while taking into account the relatively small amount of available memory and/or processing power associated with some existing client devices. One example of the ways in which the above-described systems and methods address this issue can be seen with respect to the user interface interaction referred to herein as a "hoverzoom", e.g., the process whereby when a user rolls a cursor over and/or pauses an indicator relative to a media item that can be selected, the image associated therewith is magnified so that the user can easily see which object is poised for selection, an example of which is illustrated in FIGS. 1(a) and 1(b).

There are a number of challenges associated with implementing a hoverzoom feature in bandwidth limited systems, such as interactive television systems wherein the client devices have limited memory and/or processing power. Consider the example wherein the user interface screen illustrated in FIG. 1(a) is rendered using MPEG data streams transmitted from the user interface server 42 to the client 44 containing the cover art images associated with various movies. This visual portion of the user interface screen will be referred to herein as the background layer. When the event mapper 710 and event processor 714 recognize that the user has triggered a hoverzoom response, a foreground layer (e.g., the magnified version of the "Apollo 13 image) is generated and used to modify the user interface screen of FIG. 1(a). There are several possibilities for providing the data used to transition from the user interface screen shown in FIG. 1(a) to the user interface screen shown in FIG. 1(b). One way to implement the hoverzoom effect is to have the user interface server 42 transmit complete sets of MPEG data corresponding to both the background layer and the foreground layer to the client 44. However, when one considers that the user can roll the cursor over a potentially very large number of screen objects in the user interface, e.g., dozens or hundreds, quite rapidly, the amount of data needed to be transmitted by the user interface server 42 could be quite large to implement this exemplary embodiment of the present invention, resulting in additional delay in rendering the screen transitions on the client device 44.

Moreover, it can be seen from comparing FIG. 1(a) with FIG. 1(b) that a significant portion of the pixel data associated with the unzoomed version of FIG. 1(a) is reused in creating the hoverzoomed version of FIG. 1(b). Thus, according to another exemplary embodiment of the present invention, the relationship between pixels in the background layer and the foreground layer can be determined and used to reduce the amount of data that needs to be transmitted to the client device 44 to generate a hoverzoom effect. Depending upon the object to be magnified as part of the hoverzoom effect, this relationship can be relatively simple or somewhat more complex. For example, enlarging the size of the rectangular DVD cover art images of FIG. 1(a) primarily involves enlarging a rectangular image to occlude neighboring images as part of the transition. On the other hand, more complex shapes, e.g., a doughnut shaped object with a hole in the center, present more complex situations for generating a hoverzoom effect. Consider that as the doughnut-shaped object is enlarged, the hole in the middle will expand such that background layer pixels that were previously hidden, become revealed after the hoverzoom effect has occurred.

According to one exemplary embodiment of the present invention, each pixel in the foreground version of the image is categorized as being one of: (1) completely opaque (can extract pixel color from background layer, so do not need to resend for foreground layer generation) (2) transparent (irrelevant, so do not need to resend for foreground layer), (3) translucent (e.g., pixels around edges of image can have anti-aliasing applied thereto, need to send foreground layer data for these pixels) and (4) null (e.g., doughnut "hole" pixels which reveal background pixels, need to send background layer pixels since those cannot necessarily be extracted from background layer that was originally sent to create the unzoomed interface screen). This categorization can be done a priori using any desired technique, including manual observation and/or using the pseudocode processing techniques described below, and a foreground/background map is generated wherein each pixel in the foreground layer is categorized. A hoverzoom map can be stored for each image for which a hoverzoom effect can be triggered in the user interface.

Figure 10:
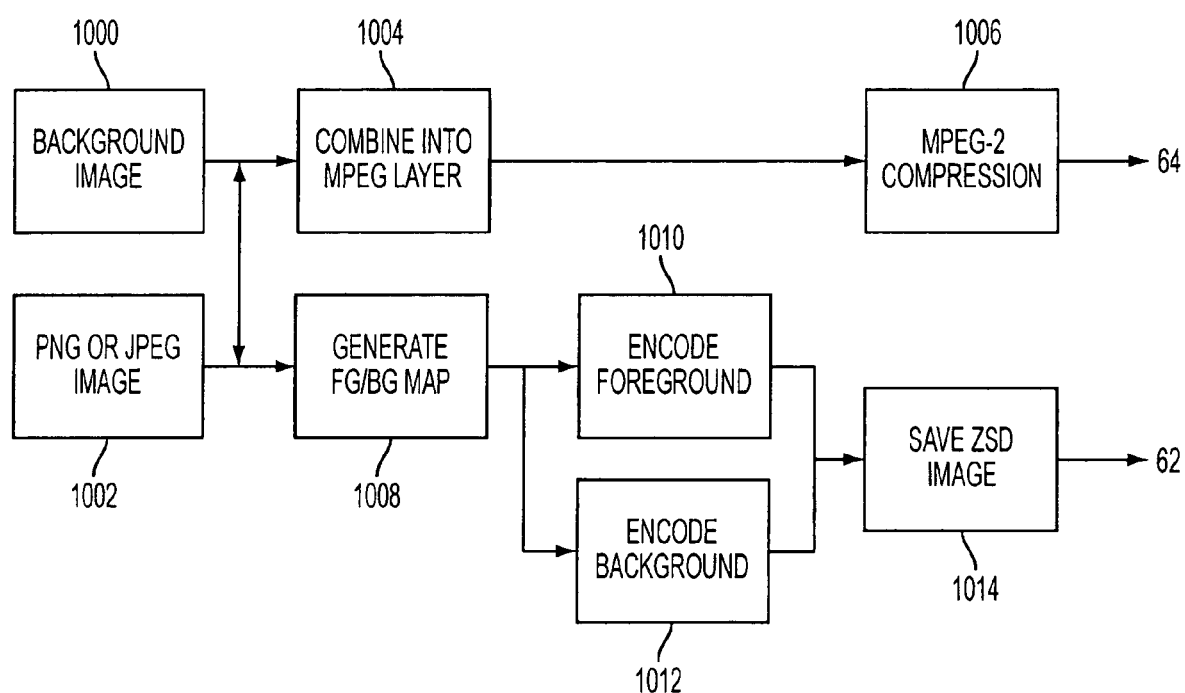
FIG. 10 depicts a technique for encoding data associated with a hoverzoom effect according to an exemplary embodiment of the present invention.

Hoverzoom processing in accordance with this exemplary embodiment of the present invention is generally illustrated in FIG. 10. Therein, an MPEG (background) version of the image 1000 and an unzoomed version 1002 of the image to be magnified (for example, Apollo 13 in FIG. 1(a)), e.g., PNG or JPEG, are provided. The background image 1000 is combined with the unzoomed version 1002 of the image at step 1004 and transmitted to the client device 44 in the MPEG data stream, after compression at step 1006. The foreground/background map described above is retrieved from storage at step 1008, and used to determine which pixel data associated with the foreground layer and the background layer needs to be transmitted. That data is encoded (compressed) at steps 1010 and 1012, saved as a ZSD image file at step 1014 and transmitted to the client device 44. Although this exemplary embodiment of the present invention transmits this information as scene data (ZSD data) outside of the MPEG data stream, it can alternatively be embedded in the MPEG data stream.

As will be appreciated by reading the foregoing discussion of hoverzoom techniques in accordance with an exemplary embodiment of the present invention, some of the challenges associated with generating sophisticated user interfaces (e.g., which employ zooming) at client devices connected to, for example, a cable network, can be addressed by intelligent selection of an encoding stream for particular data to be transmitted. In the foregoing hoverzoom example, background data was sent using the MPEG encoding stream available in such networks, while the foreground information was sent using a different type of encoding (described above), handled for presentation through the OSD layer. However, exemplary embodiments of the present invention contemplate that other server/client data transfers may benefit from selectively deciding, at one of the upstream nodes which is supplying data to the client device 44, which type of encod-

```
To Capture Background
for (node = scenegraph.rootO; node != foreground node; node = next node) if (node bounds within
        foreground bounds)
            paint node to background image
To Capture Foreground
Draw the foreground node to an image with the foreground's original size (low-res foreground)
Draw the foreground node to an image with the foreground's maximum size (high-res foreground)
After mapping, this data is encoded to reduce the amount of data to be saved and transferred at steps
1010 and 1012 using, for example, the following pseudocode to evaluate the relevance of the
background pixels based on alpha information.
To Capture Alpha Information
Calculate Foreground Node starting bounds Calculate Foreground Node ending bounds
Create an alpha image the size of the foreground starting bounds which only contains alpha values,
initialized to opaque
Set the image's alpha composite rule to keep the minimum value of either its current value or the
value of the pixel being drawn to it
while (foreground.size() <ending bounds) draw foreground to alpha image
        increase foreground size
To calculate which pixels are needed for the background image
Any pixels in the original background image which are transparent are irrelevant
For all remaining relevant background pixels
        If (low-res foreground pixel is transparent)
            Background pixel is irrelevant
        Else if (low-res foreground pixel is opaque and captured alpha pixel is opaque) Background
            pixel is irrelevant
        Else
            Background pixel is relevant
```

Depending upon the particular image to be encoded in this way, most of the foreground layer pixels will be designated as opaque and need not be resent to the client device 44 to generate the hoverzoom effect.

ing/data stream is appropriate for data to be transmitted, in particular for data associated with zooming user interfaces.

Figure 11:
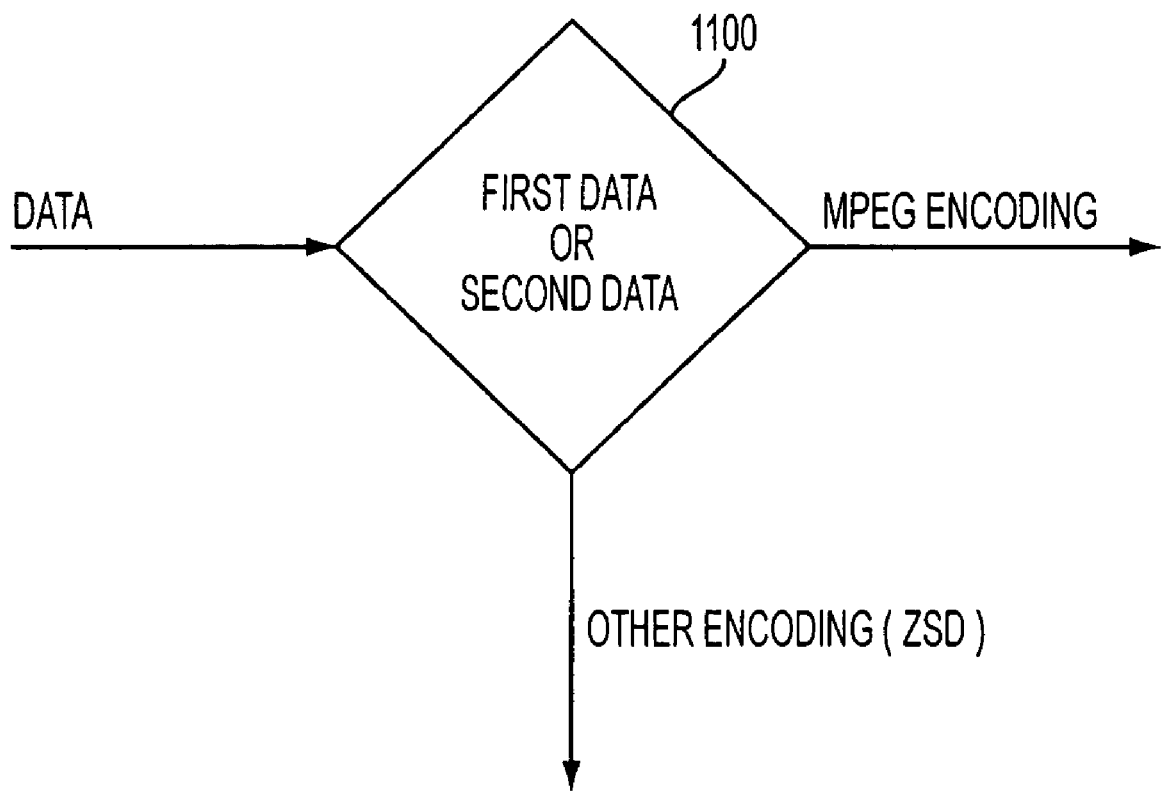
FIG. 11 illustrates selective encoding of data for transmission to a client device according to an exemplary embodiment of the present invention.

This general concept is illustrated in FIG. 11. Therein, data is evaluated at block 1100 to determine whether it is first data or second data and selectively determining a type of encoding (and associated transmit data stream) for handling that data. First and second data can be different types of data or the same type of data having different characteristics. An example of the foregoing is the hoverzoom data (background data being first data and foreground data being second data). An example of the latter is text. MPEG encoding is not particularly efficient for encoding text and, accordingly, it may be desirable to encode text under certain circumstances using another type of encoding, e.g., if the text to be transmitted is less than a predetermined font size (e.g., 16 point).

Systems and methods for processing metadata according to exemplary embodiments of the present invention can be performed by processors executing sequences of instructions contained in a memory device (not shown). Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention.

The above-described exemplary embodiments are intended to be illustrative in all respects, rather than restrictive, of the present invention. Thus the present invention is capable of many variations in detailed implementation that can be derived from the description contained herein by a person skilled in the art. For example, although MPEG encoding and MPEG data streams have been described in the foregoing exemplary embodiments, it will be appreciated that different types of encodings and data streams can be substituted therefore in part or in whole, e.g., video encodings used in Windows Media-based content and the like. Moreover, although (MPEG) image and/or video data is described as being transmitted through all or part of a cable network, the present invention is equally applicable to systems wherein the image and/or video data is available locally, e.g., on a home disk or from a local server. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. A method for transmitting data for generating a zoomable user interface from an upstream node to a client device in a cable communication network comprising the steps of:
    selectively identifying data to be transmitted from said upstream node to said client device as either first data or second data, wherein said first data includes information regarding (i) an initial position of a picture displayed by said zoomable user interface in a first scene and (ii) a final position of said picture displayed by said zoomable user interface in a second scene, and said second data includes metadata, which is related to said picture, to be displayed in said second scene but not in said first scene together with a zoomed version of said picture;
    encoding said first data using MPEG encoding;
    transmitting said MPEG encoded data via an MPEG data stream to said client device;
    encoding said second data using ZSD encoding.
    transmitting said ZSD encoded data using a second data stream to said client device; and
    generating said zoomable user interface using said first and second data.

2. A method for transmitting data for generating a zoomable user interface from an upstream node to a client device in a cable communication network comprising the steps of:
    transmitting first data using MPEG encoding and a first data stream;
    transmitting second data using ZSD encoding and a second data stream; and
    generating said zoomable user interface at said client device using said first and second data,
    wherein said first data includes information regarding (i) an initial position of a picture displayed by said zoomable user interface in a first scene and (ii) a final position of said picture displayed by said zoomable user interface in a second scene, and said second data includes metadata, which is related to said Picture, to be displayed in said second scene but not in said first scene together with a zoomed version of said picture.

3. The method of claim 2, wherein said first data is image data associated with a background layer to be generated on a user interface and said second data is data associated with a foreground layer to be generated on said user interface.

4. The method of claim 2, wherein said first data is image or video data and said second data is text.

5. The method of claim 2, further comprising the steps of:
    transmitting text as first data via said first data stream if said text has a font size which is larger than a predetermined threshold; and
    otherwise transmitting said text as second data via said second data stream.

6. The method of claim 2, wherein said upstream node is a headend portion of said cable communication network.

7. The method of claim 2, wherein said client device is one of a set-top box and a personal computer.

8. A system for transmitting data for generating a zoomable user interface from an upstream node to a client device in a cable communication network comprising:
    an upstream processor for transmitting first data using MPEG encoding and a first data stream and for transmitting second data using ZSD encoding and a second data stream; and
    a client-side processor for generating said zoomable user interface at said client device using said first and second data,
    wherein said first data includes information regarding (i) an initial position of a picture displayed by said zoomable user interface in a first scene and (ii) a final position of said picture displayed by said zoomable user interface in a second scene, and said second data includes metadata, which is related to said picture, to be displayed in said second scene but not in said first scene together with a zoomed version of said picture.

9. The system of claim 8, wherein said first data is image data associated with a background layer to be generated on a user interface and said second data is data associated with a foreground layer to be generated on said user interface.

10. The system of claim 8, wherein said first data is image or video data and said second data is text.

11. The system of claim 8, wherein said processor further operates to transmit text as said first data via said first data stream if said text has a font size which is larger than a predetermined threshold and otherwise transmitting said text as said second data via said second data stream.

12. The system of claim 8, wherein said upstream node is a headend portion of said cable communication network.

13. The system of claim 8, wherein said client device is one of a set-top box and a personal computer.

* * * * *